US010771166B1

(12) United States Patent
Hui et al.

(10) Patent No.: US 10,771,166 B1
(45) Date of Patent: Sep. 8, 2020

(54) RADIO RELAY ARRANGEMENT

(71) Applicant: Telefonaktiebolaget LM Ericsson (publ), Stockholm (SE)

(72) Inventors: Dennis Hui, Sunnyvale, CA (US); Mehrnaz Afshang, San Jose, CA (US); Jung-Fu Cheng, Fremont, CA (US)

(73) Assignee: Telefonaktiebolaget LM Ericsson (Publ) (SE)

( * ) Notice: Subject to any disclaimer, the term of this patent is extended or adjusted under 35 U.S.C. 154(b) by 0 days.

(21) Appl. No.: 16/417,119

(22) Filed: May 20, 2019

(51) Int. Cl.
*H01Q 5/40* (2015.01)
*H01Q 21/24* (2006.01)
*H01Q 21/00* (2006.01)
*H04B 15/00* (2006.01)
*H04B 7/14* (2006.01)

(52) U.S. Cl.
CPC .............. *H04B 15/00* (2013.01); *H04B 7/14* (2013.01)

(58) Field of Classification Search
CPC ........ H01Q 1/007; H01Q 21/28; H01Q 23/00; H01Q 3/2611; H01Q 3/2647; H04B 7/15507; H04B 7/15564
USPC ........ 455/7, 9, 11.1; 370/104, 277, 279, 315
See application file for complete search history.

(56) References Cited

U.S. PATENT DOCUMENTS

| | | | |
|---|---|---|---|
| 2,272,312 A | 2/1942 | Tunick | |
| 5,338,617 A * | 8/1994 | Workinger | C08J 3/226 241/3 |
| 6,745,003 B1 * | 6/2004 | Maca | H01Q 1/007 455/11.1 |
| 2005/0130587 A1 * | 6/2005 | Suda | H04B 7/15564 455/9 |
| 2006/0164318 A1 | 7/2006 | Lastinger et al. | |
| 2010/0214964 A1 * | 8/2010 | Larsson | H01Q 3/2605 370/277 |
| 2011/0291490 A1 * | 12/2011 | Shi | H01Q 1/22 307/104 |
| 2011/0292863 A1 * | 12/2011 | Braz | H04B 7/155 370/315 |

(Continued)

OTHER PUBLICATIONS

International Search Report and Written Opinion dated Jul. 15, 2020 for International Application No. PCT/EP2020/050420 filed on Apr. 27, 2020, consisting of 16-pages.

(Continued)

*Primary Examiner* — Tan H Trinh
(74) *Attorney, Agent, or Firm* — Christopher & Weisberg, P.A.

(57) ABSTRACT

There is disclosed a radio relay arrangement for a radio communication network, the radio relay arrangement including: a first relay arrangement with a first transmitter antenna array adapted for transmitting first signaling and a first receiver antenna array adapted for receiving second signaling. The radio relay arrangement further includes a second relay arrangement with a second transmitter antenna array adapted for transmitting third signaling and a second receiver antenna array adapted for receiving fourth signaling. The first transmitter antenna array and the first receiver antenna array are separated by a metallic separator, and the second transmitter antenna array and the second receiver antenna array are separated by a metallic separator. The first signaling is based on received second signaling, and the third signaling is based on received fourth signaling.

14 Claims, 1 Drawing Sheet

(56) References Cited

U.S. PATENT DOCUMENTS

| | | | |
|---|---|---|---|
| 2012/0063386 A1* | 3/2012 | Park | H04B 7/155 370/315 |
| 2012/0113889 A1* | 5/2012 | Noh | H04B 7/155 370/315 |
| 2013/0021963 A1* | 1/2013 | Maruta | H04B 7/15507 370/315 |
| 2013/0315109 A1* | 11/2013 | Raaf | H04B 7/15528 370/277 |
| 2015/0063176 A1* | 3/2015 | Hong | H04B 7/15585 370/279 |
| 2018/0092139 A1* | 3/2018 | Novlan | H04W 76/12 |
| 2018/0351605 A1 | 12/2018 | Liang et al. | |
| 2018/0375566 A1* | 12/2018 | Hong | H04B 7/15585 |
| 2019/0190564 A1* | 6/2019 | Cook | H04B 1/52 |
| 2019/0196555 A1* | 6/2019 | Mouser | G06F 1/1698 |
| 2019/0222296 A1* | 7/2019 | Khandani | H04L 5/1461 |

OTHER PUBLICATIONS

Jebur et al. "Tight Upper Bound Ergodic Capacity of an AF Full-Duplex Physical-Layer Network Coding System"; IEEE 27th Annual IEEE International Symposium on Personal, Indoor and Mobile Radio Communications—(PIMRC): Fundamentals and PHY; Location: Newcastle upon Tyne, UK, 2016, consisting of 6-pages.

* cited by examiner

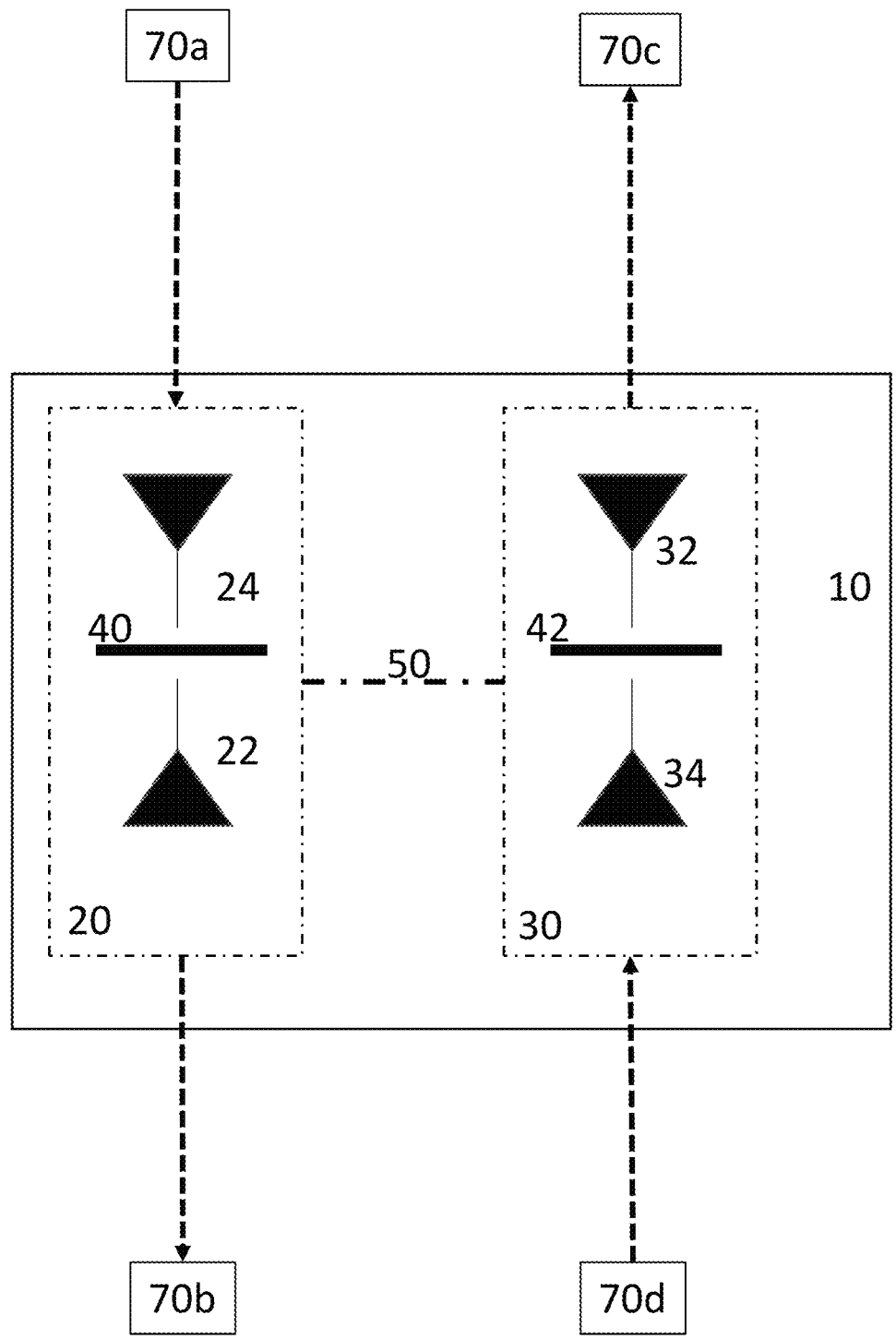

US 10,771,166 B1

RADIO RELAY ARRANGEMENT

TECHNICAL FIELD

This disclosure pertains to radio communication technology, in particular to radio relays.

BACKGROUND

For modern radio communication systems, it is expected that relay nodes are being heavily used. A relay node will receive signalling from a source, and pass it on to another direction, providing the opportunity to counter path loss effects. Such technology seems to be particularly useful and promising in the context of millimeter wave length radio signalling.

SUMMARY

This disclosure aims at providing improved approaches for construction and use of radio relay arrangements. In particular, there are described approaches lowering potential negative effects from interference from other sources and self-interference, in particular for system with high frequencies (e.g., above 52.6 GHz, or above 10 GHz or 100 GHz or 150 GHz), which may also be referred to as millimeter-wave (mmW) systems (with corresponding mmW signaling).

Accordingly, there is described a radio relay arrangement for a radio communication network. The radio relay arrangement comprises a first relay arrangement with first transmitter antenna array adapted for transmitting first signalling and a first receiver antenna array adapted for receiving second signalling. The radio relay arrangement further comprises a second relay arrangement with a second transmitter antenna array adapted for transmitting third signalling and a second receiver antenna array adapted for receiving fourth signalling. The first transmitter antenna array and the first receiver antenna array are separated by a metallic separator. The second transmitter antenna array and the second receiver antenna array are separated by a metallic separator. Further, the first signalling is based on received second signalling, and the third signalling is based on received fourth signalling. According to this arrangement, the wave fields of the individual receivers and transmitters of each relay are field-separated, such that interference effects are limited or avoided.

It may be considered that a first metallic separator separates the antenna arrays of the first relay arrangement and the antenna arrays of the second relay arrangement. This allows easy construction. However, solutions in which different metallic separators are used for the different relay arrangements are considered, for example a first metallic separator separating the antenna arrays of the first relay arrangement and a second metallic separator different from the first metallic separator separating the antenna arrays of the second relay arrangement. Such an arrangement allows flexible construction and arrangement of separators.

It may be considered that a separation by a metallic separator blocks line-of-sight transmission of radio signalling between the separated antenna arrays. Thus, a main source of interference can be eliminated. In some variants, a separation may block radio signalling in a cone extending between two outermost antenna elements of an array in the direction of the separated array. The cone may have an angle of 45 degrees or more, or 60 degrees or more extending outward relative to a parallel to the line-of-sight. This may limit multi/path interference effects.

It may be considered that the antenna arrays have multiple antenna elements, and/or are adapted for beamforming. In some variants, the first antenna array, and/or the second antenna array, and/or the third antenna array, and/or the fourth antenna array, may comprise multiple antenna elements. The number of antenna elements of different arrays may be identical, or it may be different. In some variants, the number of antenna elements of the antenna arrays of one relay arrangement may be identical, however, solutions with different numbers of antenna elements may be considered. The number of antenna elements of an antenna array may in particular be 30 or more, 64 or more, 96 or more, or 128 or more. Each antenna element of an array may be connected or connectible to provide transmission or reception of signalling, e.g. in cooperation with radio circuitry and/or processing circuitry. Accordingly, high gains and in particular beamforming may be utilized.

The first transmitter antenna array and the second receiver antenna array may have overlapping coverage areas, and/or the second transmitter antenna array and the first receiver antenna array may have overlapping coverage areas. The coverage area for a transmitter antenna array may correspond to the spacial angle and/or a volume into which the transmitter antenna array may transmit beams of radiation. The coverage area of a receiver antenna array may correspond to the spacial angle and/or the volume into which the receiver antenna array may form reception beams. It should be noted that the active coverage during operation might depend on the beamforming utilized, and might be smaller than the maximum coverage. Average areas may be considered to be overlapping if they overlap at least partly, and/or share a common spacial angle and/or volume. Accordingly, the antenna arrays with overlapping coverage areas may be utilized to provide communication in two directions to common communication partners, e.g. to a radio node or user equipment.

The radio relay arrangement may be adapted to provide interference cancellation for the first antenna array regarding signalling transmitted by the second transmitter antenna array, and/or the radio relay arrangement may be adapted to provide interference cancellation for the second receiver antenna array regarding signalling transmitted by the first transmitter antenna array. Accordingly, self-interference, if for example the radio relay arrangement is both transmitting and receiving at the same time, can be limited.

In some variants, the radio relay arrangement may be adapted for analog interference cancellation and/or digital interference cancellation and/or spacial interference cancellation. These approaches allow efficient limitation of interference.

It may be considered that the first and second signalling are on different carriers, and/or that the third and fourth signalling are on different carriers. Variants in which the signallings are on the same carriers may be considered. In some cases, carrier aggregation may be used for the first signalling and/or the second signalling and/or the third signalling and/or the fourth signalling. This allows efficient use of radio spectra.

In some variants, the first and third signalling may correspond to backhaul signalling, and/or the second and fourth signalling may correspond to backhaul signalling. First, the radio relay arrangement may be used as a relay node or router providing wireless connection instead of a cable-bound connection between nodes of a radio network.

Alternatively, or additionally, the first and third signalling may correspond to backhaul signalling, and/or the second and fourth signalling may correspond to radio access signalling. In particular, the second and fourth signalling may correspond both to radio access signalling and backhaul signalling, allowing for example implementation in an integrated and backhaul, IAB, node.

It may be considered that the first and third signalling will present communication reverse directions, and/or the second and fourth signalling will present communication in reverse directions. Accordingly, the first and third, respectively the second and fourth, signalling may be used for two-directional communication with suitable communication partners.

It may be considered that the first relay arrangement and the second relay arrangement are connected or connectible for interference cancellation. The connection may for example be via a cable, for example an optical or wire-bound communication connection. The connection may comprise processing and/or radio circuitry for evaluating and/or manipulating signalling for interference cancellation, in particular for analog and/or digital interference cancellation. The connection may, at least in part, be included and/or embedded in, and/or be attached to, the metallic separator or metallic separators. First, easy construction may be provided.

It may be considered that the metallic separator and/or the metallic separators is or are formed like, or form, a cut, or a plane, or a parabola. These forms may be suitable for different use cases and allow desired limitation of interference. In some variants, the position of the metallic separator and/or the positions of the metallic separators, may be adjustable. An adjustable position may correspond to the separator being pivotable or rotatable around an axis, and/or slideable, and/or replaceable. In some variants, the adjustment of the position, for example the rotation or pivot, may be automatic, for example using a controllable motor. The position of the metallic separator may be adjusted based on the coverage area and/or a desired range of beams.

In general, the radio relay arrangement may be adapted for millimeter-wave communication and/or radio communication or backhaul signalling and/or radio access signalling. A radio relay arrangement may be considered to be adapted for millimeter-wave communication and/or radio communication if at least one of the signallings is millimeter-wave signalling and/or radio signalling, respectively. The arrangement may be considered to be adapted for backhaul signalling and/or radio access signalling if at least one of the first, second, third and/or fourth signallings is backhaul signalling and/or radio access signalling, respectively. The metallic separator may in particular be suitable for millimeter-wave communication, in particular if both relay arrangements operate in millimeter-wave wavelength. In this case, interference patterns of variation are comparatively small, and/or multi/path effects are relatively limited due to strong absorbtion of radiation out of the line-of-sight, such that a metallic separator of relatively small size can effectively screen or separate transmitter arrays and receiver arrays.

BRIEF DESCRIPTION OF THE FIGURES

The drawings are provided to illustrate concepts and approaches described herein, and are not intended to limit their scope. The drawings comprise:
FIG. 1, showing an exemplary radio relay arrangement.

DETAILED DESCRIPTION

FIG. 1 shows an exemplary radio relay arrangement 10, which for example may be implemented as a relay node or IAB or backhaul node. However, variants in which each relay arrangement is provided as a module may also be considered.

The radio relay arrangement 10 may comprise first relay arrangement 20 which may comprise a first transmitter antenna array 22 and a first receiver antenna relay 24. Furthermore, the radio relay arrangement 10 may comprise a second relay arrangement 30, having a second transmitter antenna array 32 and a second receiver antenna array 34. The first relay arrangement 20 may also comprise a first metallic separator 40, which may be adapted to separate the radiation fields between the first antenna array 22 and the first receiver antenna relay 24. A similar metallic separator 42 may be provided for the second relay arrangement 30. Interference cancellation connection 50 may be provided between the first relay arrangement 20 and the second relay arrangement 30. The metallic separators 40, 42 may be implemented as a singular unit, or in separate parts. In general, the metallic separator 30 may be made of, and/or covered by, a metal or metallic alloy suitable to block radiation transmitted and/or received by the associated antenna arrays. A metallic separator may represent a continuous surface, or comprise holes, as long as the holes are small enough to block radiation of wavelengths used by the antenna arrays.

First transmitter radio circuitry may be associated to the first antenna array for transmitting first signalling via the first antenna array 22. First receiver radio circuitry may be associated to the first receiver antenna array 24 for receiving (second) signalling with the first receiver antenna array 24. The first transmitter radio circuitry and/or the first receiver radio circuitry may be connected or connectible to the associated antenna relays 22, 24, and/or may be included in the first relay arrangement 20 and/or the radio relay arrangement 10. The first relay arrangement 20 may be adapted, and/or controllable, to transmit first signalling, for example to one or more first targets 70b, and to, e.g. simultaneously or time-delayed, receive second signalling from one or more sources 70a. The first signaling may be millimeter wave signalling, which may for example relay second signalling received from the sources 7a. This may introduce a time delay or shift, as of course the first signalling can only relay, at a given point in time, second signalling received at an earlier point in time.

Second transmitter radio circuitry may be associated to the second transmitter antenna array 32 for transmitting third signalling via the second antenna array 32.

Second receiver radio circuitry may be associated to the second receiver antenna array 34 for receiving (fourth) signalling with the second receiver antenna array 34. The second transmitter radio circuitry and/or the second receiver radio circuitry may be connected or connectable to the associated antenna relays 32, 34, and/or may be included in the second relay arrangement 30 and/or the radio relay arrangement 10. The second relay arrangement 30 may be adapted, and/or controllable, to transmit third signalling, for example to one or more second targets 70c, and to, e.g. simultaneously or time-delayed, receive fourth signalling from one or more sources 70d. The third signalling may be millimeter-wave signalling, which may for example relay fourth signalling received from the sources 70d. This may introduce a time delay or shift, as of course the third signalling can only relay, at a given point in time, fourth signalling received at an earlier point in time.

It should be noted that transmitter and/or receiver radio circuitry may be implemented to provide both transmitting and receiving functionality, e.g. by being implemented as transceiver radio circuitry. Antenna arrays may be adapted accordingly. This allows reversal of the functionality and/or signaling directions, e.g. based on control signaling provided to the radio arrangement 10, e.g. via communication circuitry thereof. All signaling may be millimeter-wave signaling. However, in some cases some of the signaling may be at lower frequencies, in particular if the radio arrangement 10 provides radio access network functionality, e.g. on one side of the arrangement 10.

It may be considered that the radio relay arrangement 10 has two sides separated by the metallic separators 40, 42, allowing radio communication on each side with limited interference from the other side. The first transmitter antenna array 22 and the second receiver antenna array 34 may be adapted to cover a comparable region, e.g. the same cell and/or have the same or essentially the same coverage, e.g. overlapping at least to 50%, or 75% or 90% or more. The second transmitter antenna array 32 and the second transmitter antenna array 24 may be adapted to cover a comparable region, e.g. the same cell and/or have the same or essentially the same coverage, e.g. overlapping at least to 50%, or 75% or 905 or more. The cells covered by the different sides may be different and/or at different frequencies, in particular use different carriers and/or bandwidth parts.

The radio relay arrangement 10 allows full duplexing for a relay node with limited interference, facilitating efficient use of radio resources.

The metallic separator may be formed as a plate, or a parabola or it may be cup-like. It may be represented by a sheet or punctured sheet, or in some cases by a mesh, or have another form of construction, for example a foam.

A system comprising one or more radio relay arrangements as described herein, in particular a network node and a user equipment, is described. The system may be a wireless communication system, and/or provide and/or represent a radio access network.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

The approaches are particularly advantageously implemented in a 5th Generation (5G) telecommunication network or 5G radio access technology or network (RAT/RAN), in particular according to 3GPP ($3^{rd}$ Generation Partnership Project, a standardisation organization). A suitable RAN may in particular be a RAN according to NR, for example release 15 or later, or LTE Evolution. However, the approaches are also useful for other RATs, e.g. 5.5G or 6G RATs.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

A radio node may generally be considered a device or node adapted for wireless and/or radio (and/or microwave)

frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node like an IAB node, in particular for a RAN as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories and/or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN) and/or backhaul and/or IAB network, which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/ control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be sent over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes. Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

There is generally disclosed:

A1. Radio relay arrangement (10) for a radio communication network, the radio relay arrangement (10) comprising: a first relay arrangement (20) with a first transmitter antenna array (22) adapted for transmitting first signaling and a first receiver antenna array (24) adapted for receiving second signaling; the radio relay arrangement (10) further comprising a second relay arrangement (30) with a second transmitter antenna array (32) adapted for transmitting third signaling and a second receiver antenna array (34) adapted for receiving fourth signaling; the first transmitter antenna array (22) and the first receiver antenna array (24) being separated by a metallic separator (40, 42); and the second transmitter antenna array (32) and the second receiver antenna array (34) being separated by a metallic separator (40, 42); the first signaling being based on received second signaling, and the third signaling being based on received fourth signaling.

A2. Radio relay arrangement (10) according to variant A1, wherein a first metallic separator (40) separates the antenna arrays (22, 24, 32, 34) of the first relay arrangement (20) and of the second relay arrangement (30).

A3. Radio relay arrangement (10) according to one of the preceding variants, wherein a separation by a metallic separator blocks line-of-sight transmission of radio signaling.

A4. Radio relay arrangement (10) according to one of the preceding variants, wherein the antenna arrays (22, 24, 32, 34) have multiple antenna elements, and/or are adapted for beamforming.

A5. Radio relay arrangement (10) according to one of the preceding variants, wherein the first transmitter antenna array (22) and the second receiver antenna array share have overlapping coverage areas, and/or the second transmitter antenna array and the first receiver antenna array have overlapping coverage areas.

A6. Radio relay arrangement (10) according to one of the preceding variants, wherein the radio relay arrangement (10) is adapted to provide interference cancellation for the first receiver antenna array regarding signaling transmitted by the second transmitter antenna array, and/or wherein the radio relay arrangement (10) is adapted to provide interference cancellation for the second receiver antenna array regarding signaling transmitted by the first transmitter antenna array.

A7. Radio relay arrangement (10) according to one of the preceding variants, the radio relay arrangement (10) being adapted for analog interference cancellation and/or digital interference cancellation and/or spatial interference cancellation.

A8. Radio relay arrangement (10) according to one of the preceding variants, wherein the first and second signaling are on different carriers, and/or the third and fourth signaling are on different carriers.

A9. Radio relay arrangement (10) according to one of the preceding variants, wherein the first and third signaling correspond to backhaul signaling, and/or the second and fourth signaling correspond to backhaul signaling.

A10. Radio relay arrangement (10) according to one of the preceding variants, wherein the first and third signaling correspond to backhaul signaling, and/or the second and fourth signaling correspond to radio access signaling.

A11. Radio relay arrangement (10) according to one of the preceding variants, wherein the first and third signaling represent communication in reverse directions, and/or the second and fourth signaling represent communication in reverse directions.

A12. Radio relay arrangement (10) according to one of the preceding variants, wherein the first relay arrangement (20) and the second relay arrangement (30) are connected or connectable for interference cancellation.

A13. Radio relay arrangement (10) according to one of the preceding variants, wherein the metallic separator is formed like a cup or is plane or parabolic.

A14. Radio relay arrangement (10) according to one of the preceding variants, wherein a position of the metallic separator is adjustable.

A15. Radio relay arrangement (10) according to one of the preceding variants, wherein the radio relay arrangement (10) is adapted for millimeter-wave communication and/or radio communication and/or backhaul signaling and/or radio access signaling.

What is claimed is:

1. A radio relay arrangement for a radio communication network, the radio relay arrangement comprising:
   a first relay arrangement with a first transmitter antenna array configured to transmit first signaling and a first receiver antenna array configured to receive second signaling;
   a second relay arrangement with a second transmitter antenna array configured to transmit third signaling and a second receiver antenna array configured to receive fourth signaling;
   the first transmitter antenna array and the first receiver antenna array being separated by a metallic separator having an adjustable position, the adjustable position of the metallic separator being based on pre-defined criteria;
   the second transmitter antenna array and the second receiver antenna array being separated by a metallic separator having an adjustable position, the adjustable position of the metallic separator being based on pre-defined criteria; and
   the first signaling being based on received second signaling, and the third signaling being based on received fourth signaling.

2. The radio relay arrangement according to claim 1, wherein a first metallic separator separates the antenna arrays of the first relay arrangement and of the second relay arrangement.

3. The radio relay arrangement according to claim 1, wherein a separation by a metallic separator blocks line-of-sight transmission of radio signaling.

4. The radio relay arrangement according to claim 1, wherein the antenna arrays at least one of have multiple antenna elements and are configured for beamforming.

5. The radio relay arrangement according to claim 1, wherein at least one of:
   the first transmitter antenna array and the second receiver antenna array share have overlapping coverage areas; and
   the second transmitter antenna array and the first receiver antenna array have overlapping coverage areas.

6. The radio relay arrangement according claim 1, wherein at least one of:
   the radio relay arrangement is configured to provide interference cancellation for the first receiver antenna array regarding signaling transmitted by the second transmitter antenna array; and
   the radio relay arrangement is configured to provide interference cancellation for the second receiver antenna array regarding signaling transmitted by the first transmitter antenna array.

7. The radio relay arrangement according claim 1, wherein the radio relay arrangement is configured for at least one of:
   analog interference cancellation;
   digital interference cancellation; and
   spatial interference cancellation.

8. The radio relay arrangement according to claim 1, wherein at least one of:
   the first and second signaling are on different carriers; and
   the third and fourth signaling are on different carriers.

9. The radio relay arrangement according to claim 1, wherein at least one of:
   the first and third signaling correspond to backhaul signaling; and
   the second and fourth signaling correspond to backhaul signaling.

10. The radio relay arrangement according to claim 1, wherein at least one of:
    the first and third signaling correspond to backhaul signaling; and
    the second and fourth signaling correspond to radio access signaling.

11. The radio relay arrangement according to claim 1, wherein at least one of:
    the first and third signaling represent communication in reverse directions; and the second and fourth signaling represent communication in reverse directions.

12. The radio relay arrangement according to claim 1, wherein the first relay arrangement and the second relay arrangement are one of connected and connectable for interference cancellation.

13. The radio relay arrangement according to claim 1, wherein the metallic separator is one of:
- formed like a cup;
- a plane; and
- parabolic.

14. The radio relay arrangement according to claim 1, wherein the radio relay arrangement is configured for at least one of:
- millimeter-wave communication;
- radio communication;
- backhaul signaling; and
- radio access signaling.

\* \* \* \* \*